US007647251B2

United States Patent
Baeuerle et al.

(10) Patent No.: US 7,647,251 B2
(45) Date of Patent: Jan. 12, 2010

(54) PROCESS INTEGRATION ERROR AND CONFLICT HANDLING

(75) Inventors: Stefan Baeuerle, Malsch (DE); Guenter Pecht-Seibert, Malsch (DE)

(73) Assignee: SAP AG, Walldorf (DE)

(*) Notice: Subject to any disclaimer, the term of this patent is extended or adjusted under 35 U.S.C. 154(b) by 499 days.

(21) Appl. No.: 11/395,289

(22) Filed: Apr. 3, 2006

(65) Prior Publication Data

US 2007/0233754 A1    Oct. 4, 2007

(51) Int. Cl.
G06F 17/60    (2006.01)

(52) U.S. Cl. .............................. 705/26; 705/22; 705/28; 714/48

(58) Field of Classification Search .................... 714/38
See application file for complete search history.

(56) References Cited

U.S. PATENT DOCUMENTS

| | | | |
|---|---|---|---|
| 6,772,028 B1* | 8/2004 | Yen et al. ........................ 700/99 |
| 7,240,027 B2* | 7/2007 | McConnell et al. ........... 705/28 |
| 7,318,043 B1* | 1/2008 | Silver et al. .................... 705/26 |
| 7,346,536 B2* | 3/2008 | Kubota ........................ 705/10 |
| 2001/0049690 A1* | 12/2001 | McConnell et al. ...... 707/104.1 |
| 2002/0007302 A1* | 1/2002 | Work et al. .................... 705/10 |
| 2003/0097617 A1* | 5/2003 | Goeller et al. ................. 714/39 |
| 2004/0068443 A1* | 4/2004 | Hopson et al. ................. 705/26 |
| 2004/0205006 A1* | 10/2004 | Kanai ........................... 705/26 |
| 2004/0268184 A1* | 12/2004 | Kaminsky et al. ............. 714/38 |
| 2005/0004847 A1* | 1/2005 | Matsuura ...................... 705/26 |
| 2005/0004978 A1* | 1/2005 | Reed et al. .................... 709/203 |
| 2005/0289013 A1* | 12/2005 | Goldberg ...................... 705/26 |
| 2006/0041484 A1* | 2/2006 | King et al. .................... 705/26 |
| 2007/0203798 A1* | 8/2007 | Caballero et al. ............. 705/26 |
| 2007/0233580 A1* | 10/2007 | Pike et al. ...................... 705/26 |

* cited by examiner

*Primary Examiner*—Scott T Baderman
*Assistant Examiner*—Chae Ko
(74) *Attorney, Agent, or Firm*—Kenyon & Kenyon LLP

(57) ABSTRACT

A system and method are provided for handling errors that arise in communications between process agents on behalf of business objects. The system and method deal with the discovery and reconciliation of business-logic-level errors and conflicts. The system and method may operate at two levels: they may detect errors and conflicts from within a process agent based on the messages it receives or has access to, or they may detect the errors and conflicts from another object based on collection of inter-process agent messages. Errors and conflicts may be automatically reconciled. This may occur when the system or method determines potential causes of the error and the potential impact of each cause. This allows for automated error or conflict handling in many cases where the cause is trivial or where the cause and solution are definitely discernable.

9 Claims, 4 Drawing Sheets

PROCESS INTEGRATION ERROR AND CONFLICT HANDLING

BACKGROUND

Large software applications are often composed of unmanageably large amounts of executable code. In order to facilitate creation and management of large software systems, then, the systems are often composed of many different components, called business objects. Business objects are software components that encompass user interfaces, data, business rules, communication components and any other code that may relate to their function.

In order to simplify design of these large systems, business objects are often defined as collections of logically related functions and data. A large application designed to facilitate a typical mail order business may have many different business objects. An ordering business object may be used to handle incoming orders or changes to existing orders. A shipping business object may be implemented to handle all shipping related tasks, such as arranging for deliveries or determining shipping times and costs. Business objects may handle some tasks independently while communicating with other business objects to complete other tasks. Business objects may also be grouped into larger components, called deployment units (DUs), that represent related groupings of business objects. As billing and ordering are often tightly related, they may be placed in a single DU. Customer databases and employee payroll, however, are not related at all and thus would usually be placed in separate DUs. DUs may then be deployed to systems as independent units, sharing a single computing device or spanning many such devices connected over a variety of networks.

This design model suffers from several problems however. First, storing many different components all in one business object may make operation slower. Whenever one part of the business object is acting, the others may be suspended until that action is complete. Thus, if one business object communicates with another business object in order to perform a coordinated action, both business objects will be locked until that operation is complete. Users would be unable to use the objects, nor would other business objects be able to communicate with them, until the operations were completed.

When integrating business objects together, a user encounters another severe deficiency of the present system. A business object cannot be designed to coordinate with every imaginable other business object, and thus some changes will have to be made to one or both of the newly integrated business objects in order to coordinate their operations. As discussed above, this leads to a shutdown and upgrade of at least one of the business objects, as well as a review of the entire inner working of the business objects in order to learn which components within them must be changed.

DETAILED DESCRIPTION

The problems discussed in the background may be removed through the use of process agents and process integration persistence data stores, discussed in the related applications numbered as Ser. No. 11/319,514 (filed on Dec. 29, 2005) and attorney docket 11884/479,101 (filed on even date). Process agents act as intermediaries between business objects, each handling observation of a single business object and notification to another process agent of any changes that must be conveyed to another business object. By removing those functions from the business objects and placing them in associated but separate objects, business objects no longer act as obstacles to integration and updating of application systems. These business objects and process agents may still be placed in deployment units (DUs) as discussed in the background. The use of process agents, however, may result in problems with maintaining some kinds of persistence in the application system. For example, a business object may store its data in a persistent manner so that, even when the system is not operating the data is not lost. Storing earlier message data regarding inter-business-object communications in a business object would make the objects far slower and more burdensome, defeating the advantages gained through the use of process agents and persistence datastores. Process agents do not internally store the messages they have sent or received, however, and thus they do not maintain any state or information from moment to moment. Thus, when a process agent receives notification that an update to an order has been received, it may not know the status of that order nor which business objects to notify of the update. Furthermore, a process agent may need to know the messages sent by or to another business object, where those messages were never viewed by the process agent in the first place.

These problems may be solved through use of a process integration persistency data store, a persistent data store that preserves messages sent to and from the various process agents. These messages may be retrieved by process agents in order to facilitate integration between the business objects and logical deployment units. Though this allows process agents to have some integration and persistence, it does not resolve problems that arise where the messages are sent and received properly but the messages create problems at a business level. For example, an ordering DU may take an update to an existing order and, with the assistance of a PIPD, correctly send messages to update that order. If that update is unacceptable at a business level, however, because it may deplete inventory below an acceptable threshold or may allot more items to a single customer than it is allowed under a quota, the order may still go through. There is a great need, then, for a method to catch and resolve such errors or conflicts within an application system.

Figure 1:
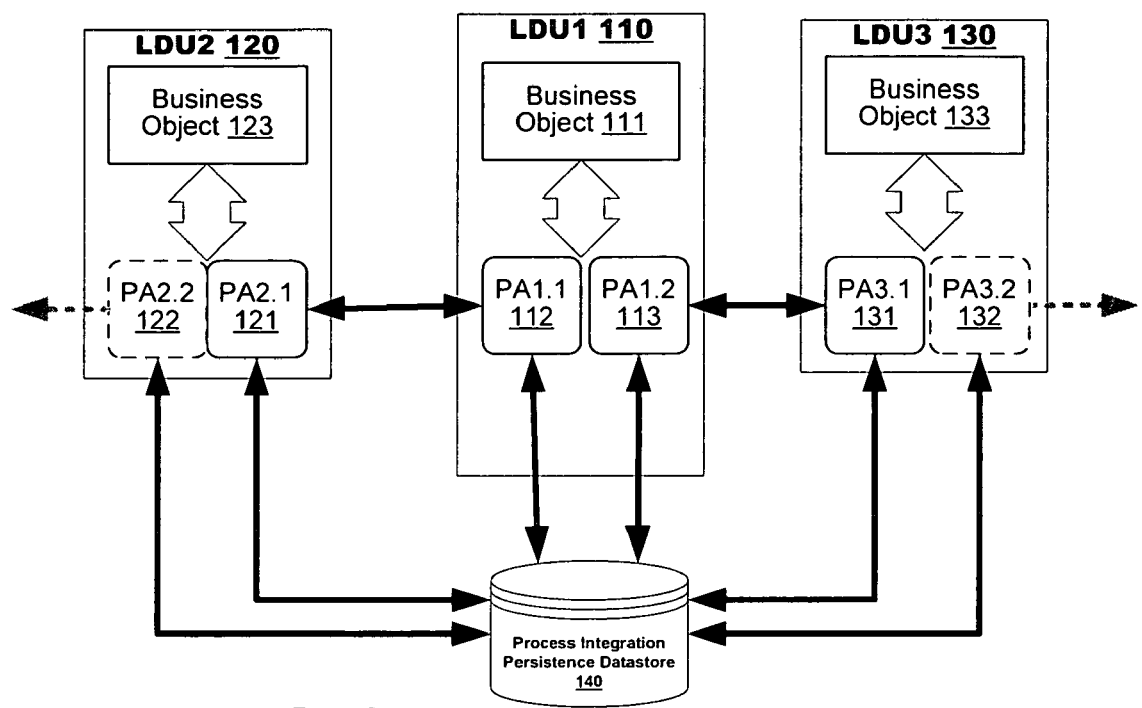
FIG. 1 shows an application system containing several logical deployment units, business objects, process agents, and a process integration persistence datastore according to an embodiment of the invention.

FIG. 1 shows a simplified block diagram of an application system consisting of business objects integrated through process agents, using a process integration persistence data store. The application system of FIG. 1 shows three different logical deployment units (DUs), DU1 110, DU2 120 and DU3 130. In an example system, these DUs could each represent departments of a business or different functional groups within a company, such as customer relationships, billing, inventory, human resources and accounting. An application system may have any number of DUs, but for simplicity this example shows only three DUs. Each DU contains any number of business objects (again for simplicity, only one business object is shown for each DU in this example). Business objects represent closely related data and business logic. Within an DU representing the billing department, for example, one might find a business object for invoicing, another for handling the processing of charges and another for generating packaging instructions for shipping. Thus, while a billing object represents data that is closely related, an DU represents a set of business objects that are related at a higher level. Though business objects represent closely related data, they must still communicate with certain related business objects due to data dependencies.

In order to communicate with other business objects, each business object is associated with a set of process agents. In one embodiment, all communications between business objects must pass through two process agents. A first process agent creates and sends a message relating to its own business object; this message is received by a second process agent associated with the receiver business object. The receiving process agent then handles tasks relevant to the receiver business object based on the message from the first process agent. In FIG. 1, for example, business object 111 is associated with process agents PA1.1 112 and PA1.2 113. Each of these process agents communicates with an associated process agent regarding the relationship between business object 111 and another business object. In FIG. 1, for example, business object 111 is associated with process agent PA1.1 112, which is in turn associated with process agent PA2.1 121 within DU2 120. Process agent PA2.1 121 is associated with a business object within DU2 120, business object 123. Process agents PA1.1 112 and PA2.1 121 handle any communication that must take place between business object 111 and business object 123. Process agent PA1.2 113 handles communication between business object 111 and business object 133 (through process agent PA3.1 131) in the same manner. Each of these other business objects has its own set of process agents; for simplicity, only two process agents are shown for each of these business objects. In FIG. 1, business object 123 is thus associated with two process agents, PA2.1 121 and PA2.2 122. While PA2.1 121 is used for communications between business object 123 and business object 111, as described above, PA2.2 122 is used for communication between business object 123 and some other business object not shown.

When process agents communicate, they do not retain an internal record of previous communications. Thus, updating an existing order could prove difficult without numerous messages to other business objects. For example, if a customer has already placed an order for goods and wishes to change one quantity of an item in that order, process agents within the ordering DU must coordinate the change with shipping (to ensure that the order is modified before it is sent) and billing (to ensure that the bill accurately reflects the new quantity of items ordered). If the order has already shipped, a message may be sent from the shipping DU to the ordering DU to inform it that no update can be made. This message is passed to the process agent within the ordering DU that handles only ordering-shipping messages; this process agent is unable to notify the billing DU that the update should not be processed. For this reason, the system also includes one process integration persistency datastore (PIPD) 140.

The PIPD 140 stores a record of each message that is sent between process agents on a system. In some embodiments, there may be several PIPDs; each could retain a complete set of records of all messages or merely a set of messages (such as all messages to or from a certain DU, for example). In some embodiments, such as the embodiment shown in FIG. 1, there is a single PIPD 140 that handles all messages between all DUs. The messages are stored in the PIPD 140 by the process agents PA1.1 112, PA1.2 113, PA2.1 121, PA2.2 122, PA3.1 131, PA3.2 132 and any other process agents, not shown, that operate within the system. The PIPD 140 may also retrieve records of messages for the same process agents, sometimes in response to a request for messages sent by the process agents. In the order update example discussed above, then, the ordering process agents could each retrieve copies of messages regarding the order from the PIPD 140; each ordering process agent would then determine whether the order could be updated. This enables the system to operate quickly, without needless messages between numerous process agent or slower messages to other DUs that may exist on different machines. As two DUs may be on separate computing devices and may even be separated by slow network components, these inter-DU communications may be incredibly slow. Thus, using PIPD 140 allows much faster operation.

Figure 2:
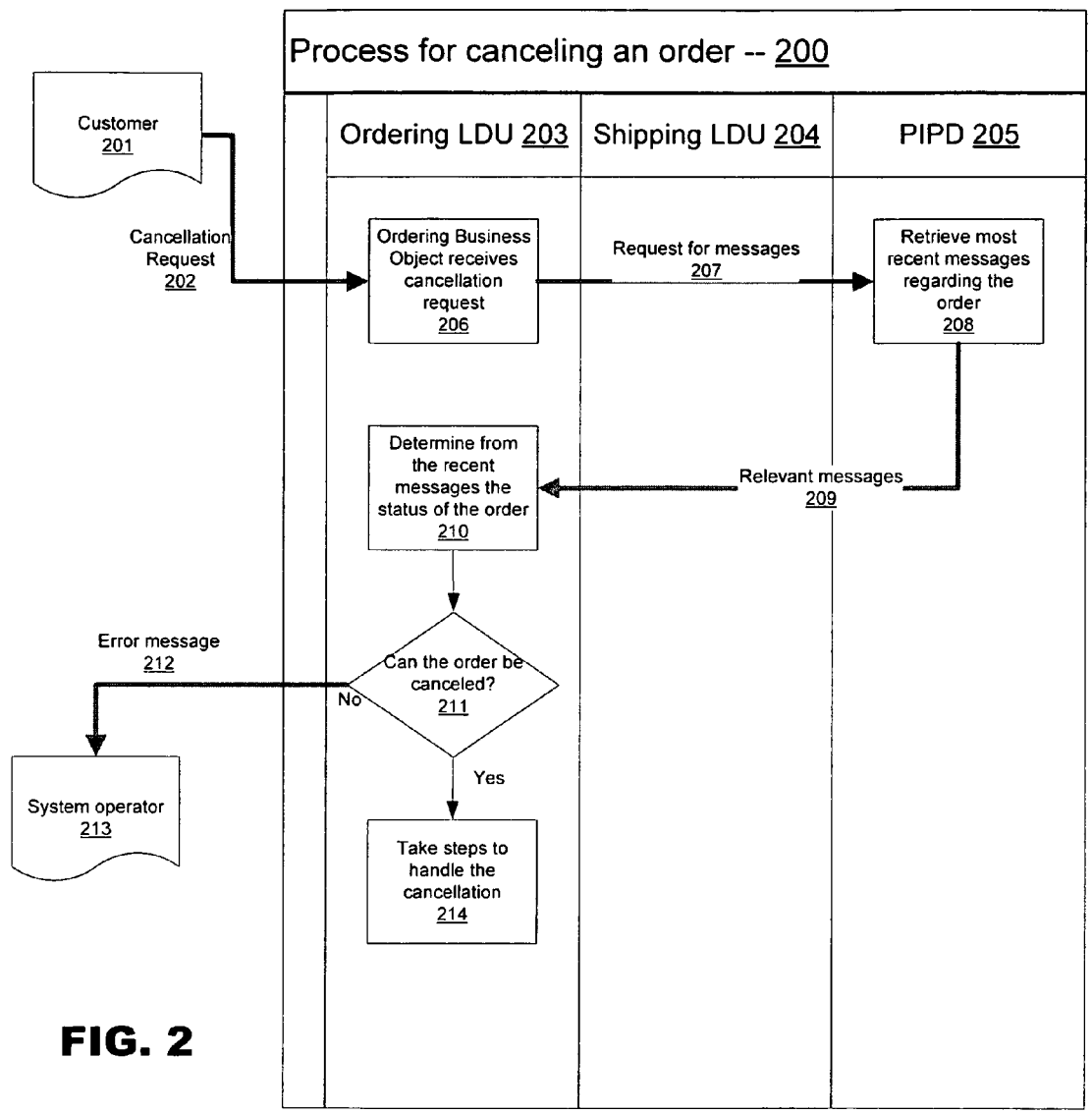
FIG. 2 shows an example process flow diagram depicting the steps that may be taken to check for errors or conflicts in canceling a product order in a retail sales system according to an embodiment of the invention.

Depicted in FIG. 2 is an example of how the process integration persistency database (PIPD) functions in one embodiment. FIG. 2 shows the communications and steps involved when a customer 201, having previously placed an order for goods into the system, wishes to cancel that order. For demonstrative purposes, this example uses two DUs; in reality all communication could also occur between process agents associated with business objects within the same DU. Though messages are depicted as sent or received by DUs, in the preferred embodiment the messages are sent and received by process agents within the respective DUs; for simplicity only the DUs are shown. Customer 201 first sends a cancellation request 202 to the ordering DU 203. The ordering DU 203 receives the cancellation request 202 at processing block 203. In order to cancel the order, the ordering DU 203 must determine the current status of the order, including all steps taken to fulfill the order by other DUs. Thus, after the cancellation request is received, the ordering DU 203 generates and sends a request for messages relating to the relevant order 204 to the PIPD 205. The PIPD 205 maintains records of messages that have been sent between business objects within the same DU or across different DUs. At processing block 208, the PIPD 205 retrieves from its store the records of the most recent messages related to the order in question. In some embodiments, the PIPD 205 may retrieve all records related to the order. In some embodiments, the PIPD 205 may retrieve records determined by different criteria, based on the business object that requests them. Once the records are retrieved, the PIPD 205 sends the retrieved records 209 to the ordering DU 203. The ordering DU 203 may then determine the status of the order based on the retrieved records 209 retrieved from the PIPD 205 at processing block 210. These retrieved records 209 may indicate which business objects have received the order and taken action to fulfill it. Using this information, the ordering DU 203 may determine if cancellation is even possible, at processing block 208. The ordering DU 203 may include logic that determines that an order may be canceled until it has been shipped, for example. In that case, the ordering DU 203 may find within the retrieved records 209 a record of a message from a shipping DU (not shown) that an order has been shipped. Alternatively, it may send a query message to the shipping DU itself, which could retrieve and send its own internal data regarding the order. The ordering DU 203 could then take steps to reject the cancellation request 202.

These steps may include generating and conveying error message 212 to the system operator 213. Error message 212 may include any information. In some embodiments, error message 212 may include merely a denial of the cancellation, such as "This order may not be cancelled." In some embodiments, the error message 212 may include more detailed information, including the relevant messages 209 and the reasons why the order could not be cancelled. The system operator 213 may be the customer, a customer service representative or any other person. The error message 212 may be conveyed to the system operator 213 in any manner. This method is only one possible embodiment of the present invention; many other embodiments may exist. In other embodiments, the error message 212 may be relayed to another DU, for example, or may only be stored internally. Alternatively, if the order may be cancelled, the ordering DU 203 may handle whatever steps are necessary to cancel the order at processing block 214.

Figure 3:
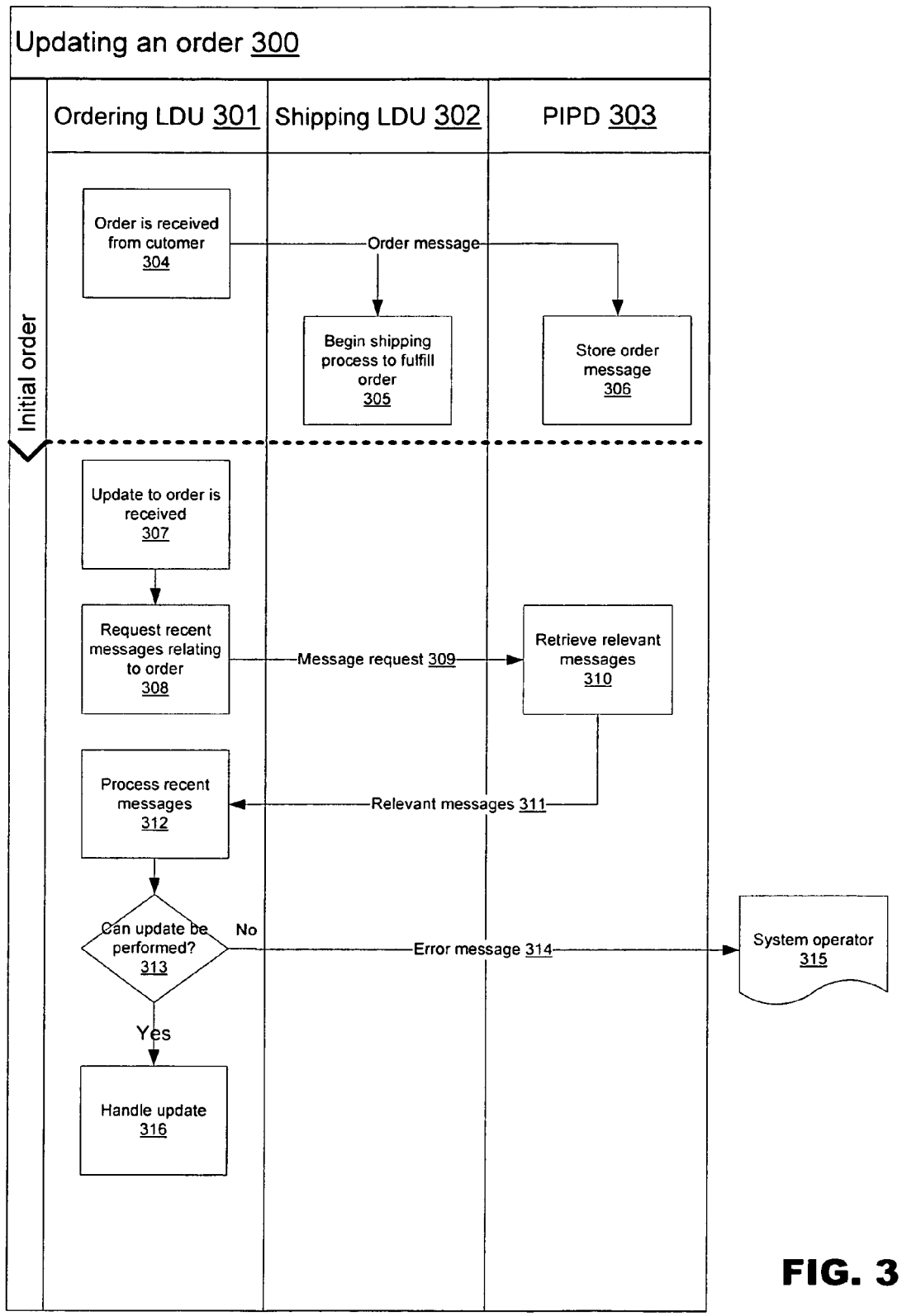
FIG. 3 shows an example process flow diagram depicting the steps that may be taken to check for errors or conflicts in updating a product order in a retail sales system according to an embodiment of the invention.

FIG. 3 shows another example of how the PIPD functions in one embodiment. The example shown in FIG. 3 demonstrates the process followed when a customer places an order and subsequently changes the order. When an order is received by the ordering DU 301 at processing block 304, an order message is created and sent to the shipping DU 302 in order to initiate the shipping process at processing block 305. The order message is also sent to the PIPD 303 for storage at processing block 306. At a later time, the customer may wish to change the order to reflect different items or quantities for purchase. A request to update the order may then be sent to the ordering DU 301, either by the customer directly (using an internet-accessible user interface, for example) or indirectly (through the customer's own systems, which are connected to the ordering DU 301 by some network, for example). When the ordering DU 301 receives a request to update the order at processing block 307, it may first determine the status of the order. In order to send appropriate messages to other DUs or to the customer, the ordering DU 301 must first determine what actions have already taken place. If the order has already been shipped, it may be too late for the customer to update the order, for example. The changes made to a billing procedure may be different depending on whether the customer has not yet been billed (possibly requiring only an updated bill be sent to the customer) or has been billed and has paid (possibly requiring a refund or an additional bill and explanation be generated). In order to determine the status of the order, the ordering DU 301 may send a message request 309 to the PIPD 303. The message request 309 identifies the subject of the request (in this case, for example, an order number may suffice, or a customer number and a temporal identifier). The PIPD 309 may receive the message request 309 and, in processing block 310, may retrieve the records of messages that are relevant to the request. In some embodiments, this may entail retrieving only the most recent records regarding the order in question; in some other embodiments it may entail retrieving all records regarding the customer who placed the order. The criteria for determining which records are relevant may be specified differently for each system. The relevant records 311 are then sent to the ordering DU 301. Once the ordering DU 301 has processed the relevant records 311 at processing block 312, the Ordering DU 301 may determine whether the update may be performed at processing block 313. If the update cannot be performed for any reason, the ordering DU 301 may send an error message 314 to a system operator 315. The system operator 315 may be the customer who submitted the order or any other person. If, instead, the order may be updated, the ordering DU 301 may handle updating operations at processing block 316.

Figure 4:
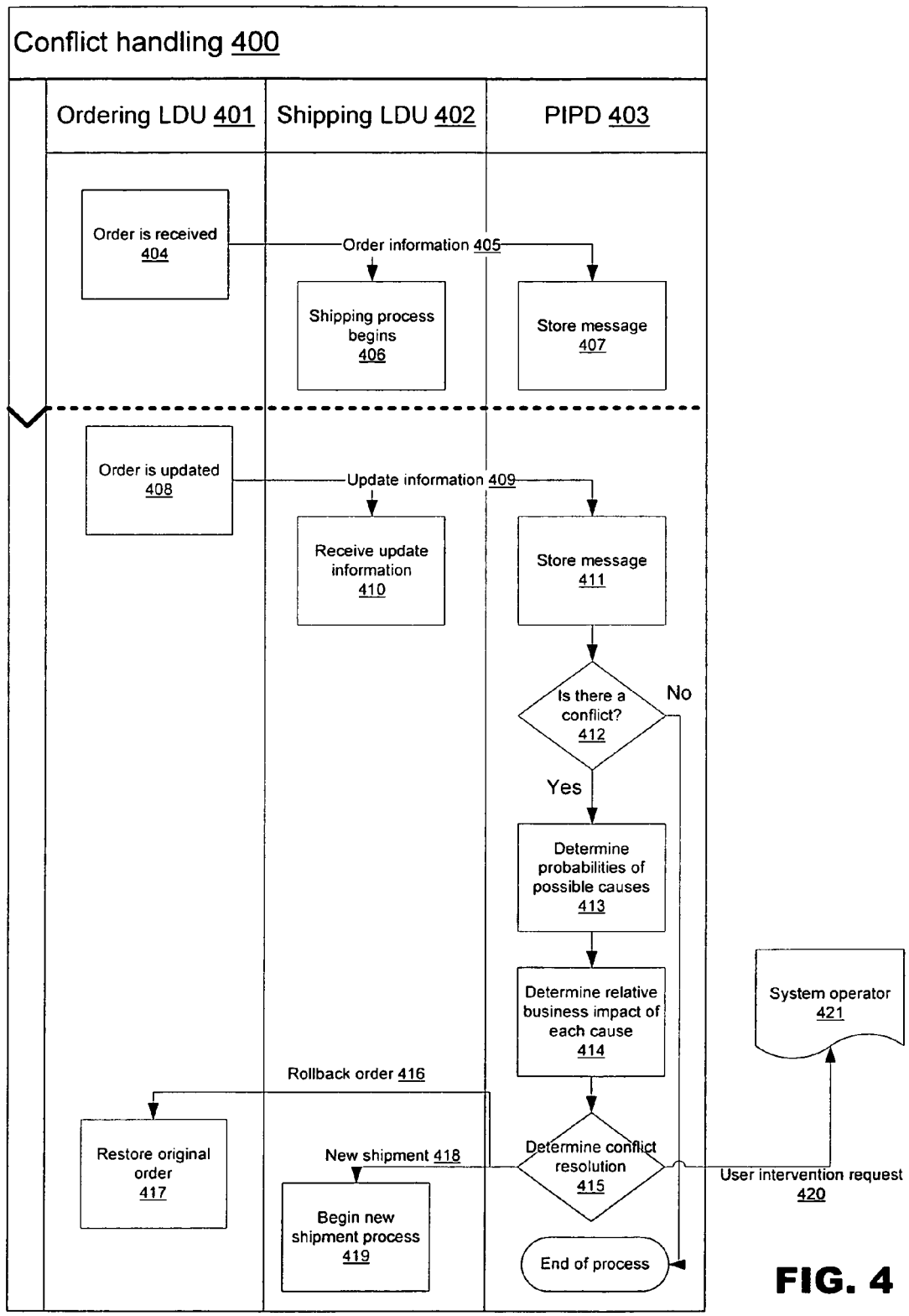
FIG. 4 shows an example process flow diagram depicting the steps that may be taken to check for and resolve business conflicts that arise from inter-business-object messages.

FIG. 4 depicts an example flow chart representing the conflict resolution method of one embodiment of the invention. Conflict handling method 400 may begin at processing block 404 when an order is received by an ordering DU 401. The ordering DU 401 may respond to the order by sending order information 405 to a shipping DU 402 and the process integration persistence datastore (PIPD) 403. The shipping DU 402, at processing block 406, may then begin the shipping process. The PIPD 403, at processing block 407, may store the order information 405 upon receipt. Some time later, the ordering DU 401 may receive an update to the order at processing block 408. The ordering DU 401 may send update information to the shipping DU 402, received at processing block 410, and to the PIPD 403, stored at processing block 411. The PIPD 403 may contain logic to determine, at processing block 412, whether there is a business conflict created by the update. This logic may include rules such as "an order may not be updated once shipping has begun." The PIPD 403 may contain a record of messages sent between business objects and thus may apply its internal rules to the record of messages to determine the existence of a conflict. If no conflict is detected, the PIPD 403 has completed its analysis and the conflict handling process is complete.

If a conflict is detected, however, the PIPD 403, at processing block 413, may determine a set of different possible causes of the conflict. This determination may instead occur in LDU 402 as a function of a business object, process agent, or other internal component. For simplicity, the following discussion will only discuss the PIPD 403 as the error handling mechanism, but one skilled in the art will recognize that this role may instead be taken by the a business object, process agent, or other component. The determined set of different possible causes may be called the category of the conflict. In the case of an update that arrives after shipping has begun, for example, the possible causes of the conflict include late updates submitted by the customer (which may be considered a likely cause in this example), an update message that was submitted in a timely fashion but is received late (which may be considered a less likely cause in this example), a duplicate update message that is received after the original, timely update message (which may be considered a highly improbable cause in this example), or any number of other causes. After the PIPD 403 has determined the possible causes of the error and their respective probabilities, the PIPD 403, at processing block 414, assesses the potential impact each cause and potential solution could have on the transaction. Regardless of the likelihood of the cause, each cause and solution may have a different impact. Erroneously accepting a minor update to an order from a customer that does not represent a large portion of the system's business will likely have little or no effect on the business, while erroneously canceling a substantial addition to an order from a major customer may have severe consequences.

The PIPD 403, after assessing the probabilities of various possible causes and the impact of possible solutions, may be able to generate an automatic conflict resolution at processing block 415. For very likely causes, the solutions to which will have little impact even if the cause was incorrectly diagnosed, an automatic resolution may be found. If a likely cause has a potentially disastrous solution if incorrectly diagnosed, however, an automatic resolution may be unlikely. This may also be true of situations where equally likely causes have dramatically different solutions. Some automatic resolutions to a conflicting update order include sending a command to rollback the transaction within order 416 to ordering DU 401 which, at processing block 417, may cause the order update to be refused. Another automatic resolution may be a command to initiate a new shipment within order 418, sent by the PIPD 403 to the shipping DU 402, resulting in a new shipment process at processing block 419. In other embodiments of the present invention, or even in response to different conflicts that arise within this example embodiment, any number of other automatic resolutions are possible. If an automatic resolution is not available based on the particular conflict, the PIPD 403 by send a user intervention request 420 to a system operator 421. This request may be an error message, an email or any other signal to the system operator 421 that intervention is required to resolve the conflict. The system operator 421 may be any user of the system, including customers, system managers and technical support staff. The user intervention request 420 may include details regarding the conflict, possible causes and solutions, or any other information.

Though many of the above descriptions detailed the error and conflict handling as occurring within a PIPD, for example, these functions may be located within one or several different components. For example, all of the error and conflict handling may be handled within individual business objects. This arrangement would make sense where errors are easily found based solely on the business object's own data. This arrangement is far simpler, requires less inter-business-object communication, and is sufficient in many situations. Alternatively, a separate component could handle all error handling for a DU, monitoring all business objects for conflicts or errors. The functions could also be split amongst several objects in a DU, each performing a part of the whole method. The above discussion deals only with error and conflict handling within a PIPD for simplicity. Nothing in the method need be restricted to that component or any other. A simple embodiment of this invention may consist of a routine within each business object for automatically handling business logic problems whenever problematic messages arrive. A far more complicated embodiment of the present invention may involve a dedicated object for handling coordinated conflict resolution between the various business objects within a single DU and for handling communication with other similarly dedicated objects in other DUs. Nothing in this description of the present invention should be construed to limit the methods to a particular embodiment depicted or described.

What is claimed is:

1. A computer-implemented method for handling a processing inconsistency in an application system comprising:
   receiving a first message at a first business object;
   receiving a second message at a second business object;
   applying a set of rules to at least one of the first message and second message;
   determining the presence of the processing inconsistency based on the application of the set of rules;
   using a processor to apply the set of rules to estimate potential causes of the processing inconsistency and assign first probabilities thereto;
   using the processor to apply the set of rules to determine a likelihood that each potential solution to each potential cause of the processing inconsistency will have a predetermined business impact;
   using the processor to select an actual solution based on:
      the potential cause having a high probability compared to the other potential causes, and
      the likelihood of the potential solution to the potential cause, and
   resolving the processing inconsistency based on the actual solution to the processing inconsistency.

2. The computer-implemented method of claim 1, where the processing inconsistency is resolved using the solution having a lowest expected business impact based on the likelihood of the potential solution and the probability of the potential cause.

3. The computer-implemented method of claim 1, where the actual solution to the processing inconsistency includes a request for action by a user.

4. The computer-implemented method of claim 1, where the actual solution to the processing inconsistency is performed automatically.

5. An article of manufacture having a machine-readable medium comprising instructions for execution by one or more processors that, when executed, cause the one or more processors to perform a method comprising:
   receiving a first message at a first business object;
   receiving a second message at a second business object;
   applying a set of rules to at least one of the first message and second message;
   determining the presence of the processing inconsistency based on the application of the set of rules;
   applying the set of rules to estimate potential causes of the processing inconsistency and assign first probabilities thereto;
   applying the set of rules to determine a likelihood that each potential solution to each potential cause of the processing inconsistency will have a predetermined business impact;
   selecting an actual solution based on:
      the potential cause having a high probability compared to the other potential causes, and
      the likelihood of the potential solution to the potential cause, and
   resolving the processing inconsistency based on the actual solution to the processing inconsistency.

6. The article of manufacture of claim 5, where the processing inconsistency is resolved using the solution having a lowest expected business impact based on the likelihood of the potential solution and the probability of the potential cause.

7. The article of manufacture of claim 5, where the actual solution to the processing inconsistency includes a request for action by a user.

8. The article of manufacture of claim 5, where the actual solution to the processing inconsistency is performed automatically.

9. An enterprise network, comprising:
   a plurality of business objects, the business objects storing data representing a plurality of business transactions,
   a plurality of process agent pairs, the process agent pairs representing a plurality of communication paths between business objects,
   a datastore, the datastore storing records of communication between the process agents, and
   a set of logical rules, the set of logical rules:
      determining the presence of the processing inconsistency based on the application of the set of rules;
      applying the set of rules to estimate potential causes of the processing inconsistency and assign first probabilities thereto;
      applying the set of rules to determine a likelihood that each potential solution to each potential cause of the processing inconsistency will have a predetermined business impact;
      selecting an actual solution based on:
         the potential cause having a high probability compared to the other potential causes, and
         the likelihood of the potential solution to the potential cause, and
      resolving the processing inconsistency based on the actual solution to the processing inconsistency.

* * * * *

UNITED STATES PATENT AND TRADEMARK OFFICE
CERTIFICATE OF CORRECTION

PATENT NO.      : 7,647,251 B2                                    Page 1 of 1
APPLICATION NO. : 11/395289
DATED           : January 12, 2010
INVENTOR(S)     : Baeuerle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 573 days.

Signed and Sealed this

Sixteenth Day of November, 2010

David J. Kappos
*Director of the United States Patent and Trademark Office*